United States Patent [19]

Uematsu

[11] Patent Number: 4,685,790

[45] Date of Patent: Aug. 11, 1987

[54] FILM GUIDE DEVICE IN A CAMERA

[75] Inventor: Kimio Uematsu, Tokyo, Japan

[73] Assignee: Nippon Kogaku K. K., Tokyo, Japan

[21] Appl. No.: 889,790

[22] Filed: Jul. 28, 1986

[30] Foreign Application Priority Data

Aug. 7, 1985 [JP] Japan ............................ 60-121096[U]

[51] Int. Cl.$^4$ .......................... G03B 1/48; G03B 17/28
[52] U.S. Cl. .................................... 354/203; 354/212; 352/224
[58] Field of Search ...................... 354/203, 212, 288; 352/224

[56] References Cited

U.S. PATENT DOCUMENTS

| 2,903,953 | 9/1959 | Meixner | 354/203 |
| 3,311,037 | 3/1967 | Winkler | 352/221 |
| 3,707,904 | 1/1973 | Engelsmann et al. | 352/221 |
| 4,132,473 | 1/1979 | Kondo | 354/203 |

Primary Examiner—A. A. Mathews
Attorney, Agent, or Firm—Shapiro and Shapiro

[57] ABSTRACT

In a camera provided with an openable and closable back lid, and a film easy load device for automatically taking up around a take-up spool a film leader portion drawn out of a film cartridge loaded into a film supply chamber, the film leader portion being formed by partially cutting away one side edge of the film, a film guide device comprises a pair of guide rails including a first rail in contact with the one side edge of the film and a second rail in contact with the other side edge of the film, the guide rails extending in the film feeding direction and forming a film passage channel therebetween, film departure preventing means projected from the substantially central position of the first rail toward the back lid and preventing the one side edge of the film in a state in which the leader portion is in contact with the take-up spool from departing outwardly from the passage channel, and a film pressure plate having an escape portion at a location corresponding to the film departure preventing means and adapted to contact the upper surfaces of both of the pair of rails when the back lid is closed, thereby maintaining the degree of planarity of the film in the passage channel.

6 Claims, 3 Drawing Figures

FILM GUIDE DEVICE IN A CAMERA

BACKGROUND OF THE INVENTION

1. Field of the Invention

This invention relates to a film guide device in a camera, and in particular to a film guide device suitable for a camera having an easy load device for automatically winding the leader portion of a film loaded into the camera onto a take-up spool and taking up the film.

2. Related Background Art

As the film easy load device of a camera, there is known one in which, as shown, for example, in FIG. 3 of the accompanying drawings, a film cartridge 3 is loaded into the film supply chamber 2 of a camera 1, a film F is drawn out of the film cartridge 3 until the leading end of the leader portion F1 thereof arrives at a leading end position index mark 4, whereafter the leader portion F1 of the film F is placed on the cylindrical surface of a take-up spool 5, the perforations of the film F are brought into mesh engagement with the teeth 7a of a sprocket 7 with the side of the film F being placed between a pair of guide rails 6 and 60 forming a film passage channel near an aperture A for exposure, and when a back lid (removed in FIG. 3) is closed in such set state of the film F, the film F may be taken up onto the cylindrical surface of the spool 5 by the closing operation of the back lid or by the releasing operation thereafter.

However, in the set state of the film F in a camera having such a conventional film easy load device, the film F is positioned between the guide rails 6 and 60 as indicated by solid line in FIG. 3, and the perforations of the film F must be in mesh engagement with the teeth 7a of the sprocket 7. For this reason, protrusions 8–11 for preventing any vertical positional deviation of the film F are provided at four locations at the opposite ends of the film passageway, but in said state, a cut-away portion A10 formed in the leader portion F1 of the film F escapes from the upper protrusion 9 and therefore, the film F is liable to deviate upwardly as indicated by dots-and-dash line in FIG. 3. Further, the film F may float up from the guide rails 6 and 60 due to the curling or the like of the film F itself and therefore the perforations of the film F may become disengaged from the sprocket teeth 7a and the film F may deviate toward the position indicated by dots-and-dash line in FIG. 3 and ride onto the guide rail 6, and this has led to a problem that if the back lid is closed in such a set state, the film F will be nipped between the pressure plate and the rail 6 and fail to be taken up on the take-up spool 5.

SUMMARY OF THE INVENTION

The present invention has been made in view of the above-noted problems peculiar to the prior art and an object thereof is to provide a film guide device in a camera in which the deviation of a film in the set state of the film is prevented to thereby ensure the film to be taken up reliably.

To achieve the above object, the technical gist of the present invention is that in an easy load device for automatically taking up the leader portion of film on the cylindrical surface of the take-up spool of a camera, film departure preventing means protruding from the first rail of a pair of first and second guide rails cooperating with a pressure plate for pressing the surface of the film adjacent to a film aperture to form a passage channel through which the film may pass is provided in the vicinity of the central portion of the first rail positioned on the cut-away portion side of the film leader portion having a cut-away portion on one side of the film and the pressure plate is provided with an escape portion which permits the escape of the film departure preventing means. By the film departure preventing means, the film is prevented from riding onto the first rail, and the film is controlled so as to pass through a passageway interposed between the pair of guide rails. Also, the pressure plate and the film departure preventing means are prevented from interfering with each other by the escape portion provided in the pressure plate when the pressure plate presses the surface of the film, whereby the degree of planarity of the film can be maintained.

Other objects and features of the present invention will become apparent from the following description taken in conjunction with the accompanying drawings.

DESCRIPTION OF THE PREFERRED EMBODIMENT

Figure 1:
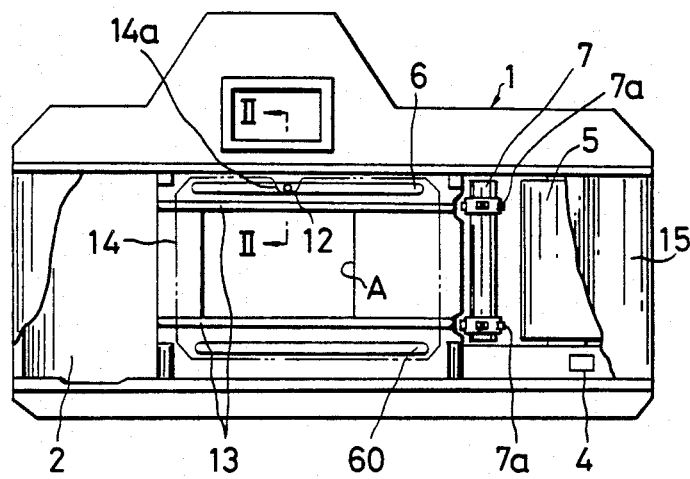
FIG. 1 is a back view of a camera showing an embodiment of the present invention with the back lid thereof being partly broken away.
Figure 3:
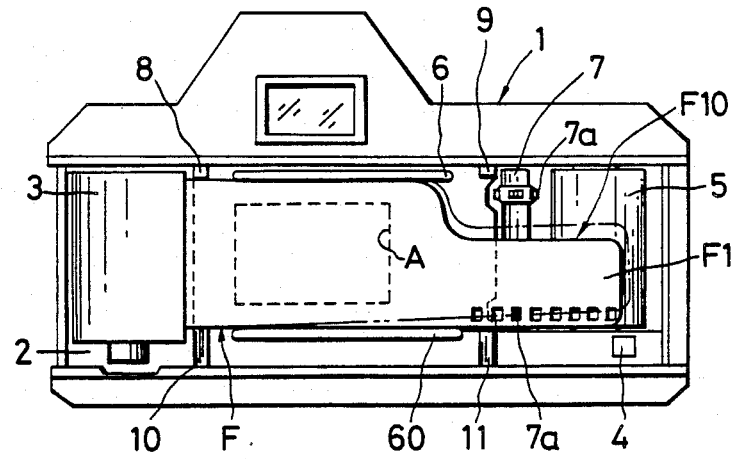
FIG. 3 is a back view of a camera according to the prior art with the back lid thereof removed.

In the camera according to an embodiment of the present invention shown FIG. 1, portions similar to those of the conventional camera shown in FIG. 3 are given similar reference characters so as to facilitate the comparison thereof with the camera of FIG. 3, and need not be described herein.

Figure 2:
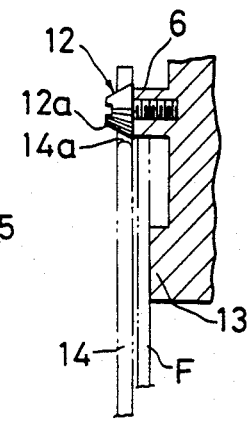
FIG. 2 is an enlarged cross-sectional view taken along line II—II of FIG. 1.

A pair of guide rails 6 and 60 form a part of the easy load device of the camera shown in FIGS. 1 and 2. In the vicinity of the central portion of the first rail 6 which is near a film aperture A, there is provided a bolt 12 as a projection which projects from the first rail 6 and restrains a film F from deviating outwardly from the first rail 6.

The pair of rails 6 and 60 guide the sides of the film F placed in a channel inside the rails 6 and 60, the first rail 6 is positioned on the cut-away portion F10 (shown in FIG. 3) side of the leader portion F1 of the film F.

The rails 6 and 60 are designed such that when a back lid 15 is closed, they cooperate with a pressure plate 14 provided on the back lid 15 to form a tunnel through which the film F may pass. Inside the rails 6 and 60, there are disposed guide rails 13 and 13 of lower height than the rails 6 and 60, and the film F may pass through the tunnel between the rails 13, 13 and the pressure plate 14 provided on the back lid.

As shown in FIG. 2, the bolt 12 is screwed into the first rail 6, and the head 12a thereof protruding from the end surface of the first rail 6 is formed in a frusto-conical shape in which the portion in contact with the first rail 6 is thicker and the portion toward the upper end is thinner, and the bolt 12 is constructed so that the side of the frusto-conical head thereof prevents the side of the film F from departing from the film passageway beyond the first rail 6. Accordingly, when the film F is pressed by the pressure plate 14, the side of the film F is adapted to bear against the inner side of the first rail 6.

The pressure plate 14 is formed with an escape recess 14a which is cut away so that the pressure plate may not strike against the head 12a of the bolt 12. The end edge portion of the escape recess 14a is chamfered so as not to injure the film F.

The camera according to the embodiment shown in FIG. 1 is constructed as described above and therefore, when the film F is to be loaded into the camera 1, as in the case of the conventional camera shown in FIG. 3, a film cartridge 3 is loaded into the film supply chamber 2 of the camera 1, and the film F is drawn out of the cartridge 3 until the leading end edge of the leader portion F1 thereof comes to a leading end position index mark 4, whereafter the leader portion F1 of the film F is placed on the cylindrical surface of a take-up spool 5, and with the film F being placed in the film passageway between the pair of rails 6 and 60, the perforations of the film F are brought into mesh engagement with the sprocket teeth 7a of a sprocket 7.

Even if with the film F being thus set, the film F is about to float up from the rails 6 and 60 and depart from the film passage channel due to the curling or the like of the film F itself, the film F will not deviate upwardly as viewed in FIG. 1 because the head 12a of the bolt 12 protrudes higher than the upper end surface 6a of the first rail 6 and the side of the film F which has floated up bears against the head 12a.

When the back lid 15 is closed with the film F being thus set, as shown in FIG. 2, the film F is pressed by the pressure plate 14 and is thereby ensured to be properly positioned in the channel inside the rails 6 and 60, and in this position, the film is nipped between the pressure plate 14 and the rails 13, 13, whereby the perforations of the film F properly mesh with the sprocket teeth 7a. Accordingly, by the film advancing operation after the back lid 15 is closed, or by the automatic film advancing operation attributable to the releasing operation, the film F is reliably taken up on the cylindrical surface of the take-up spool 5.

According to the above-described embodiment, the head 12a of the bolt 12 forms an inclined surface as shown in FIG. 2 and therefore, even if the film F floats up due to the curling or the like of itself and the side of the film F rides onto the head 12a, when the back lid 15 is closed in such state, the film F is pushed by the pressure plate 14 and is thereby guided to the inclined head 12a, and thus is properly positioned inside the rails 6 and 60.

Also, in the above-described embodiment, a projection is provided on the first rail 6, but of course, the projection may be provided projectedly directly from the body of the camera 1.

Further, in the above-described embodiment, the film F has been described as being fed from left to right as viewed in FIG. 1, but where the film is fed in the opposite direction, said cut-away F10 faces downwardly and therefore the film F tends to deviate downwardly and thus, said projection which prevents the film F from deviating outwardly may be provided on the second rail 60 side.

According to the present invention, as described above, even if the film F in its set state floats up due to the curling or the like of itself, the film F will be restrained by the projection 12 protruding from the first rail 6 and thus will not deviate outwardly from the first rail 6 and therefore, it is ensured that the film F be set at a proper position in the film passageway between the pair of rails 6 and 60, whereby take-up of the film F can be accomplished reliably.

I claim:

1. In a camera provided with an openable and closable back lid, and a film easy load device for automatically taking up around a take-up spool a film leader portion drawn out of a film cartridge loaded into a film supply chamber, said film leader portion being formed by partially cutting away one side edge of said film, a film guide device comprising:
   a pair of guide rails including a first rail in contact with said one side edge of the film and a second rail in contact with the other side edge of the film, said guide rails extending in the film feeding direction and forming a film passage channel therebetween;
   film departure preventing means projected from the substantially central position of said first rail toward said back lid and preventing said one side edge of said film in a state in which said leader portion is in contact with said take-up spool from departing outwardly from said passage channel; and
   a film pressure plate having an escape portion at a location corresponding to said film departure preventing means and adapted to contact the upper surfaces of both of said pair of rails when said back lid is closed, thereby maintaining the degree of planarity of the film in said passage channel.

2. A film guide device according to claim 1, wherein said film departure preventing means includes a bolt having a frusto-conical head and is studded in the upper surface of said first rail, and said pressure plate has a recess of sufficient size to receive the head of said bolt therein.

3. In a camera provided with an openable and closable back lid, and a loading device for automatically taking up around a take-up spool a film leader portion drawn out of a film cartridge loaded into a film supply chamber, said film leader portion being formed by partially cutting away one side edge of said film, a film guide device comprising:
   a pair of guide rails including first and second rails arranged on first and second lines, respectively, extending along the opposite sides of the film moved from said film cartridge toward said take-up spool, said first rail having a sufficient height in a direction perpendicular to the surface of the film to contact said one side edge of the film, said second rail having a sufficient height in the direction perpendicular to the surface of the film to contact the other side edge of the film;
   a projection member provided on said first line and substantially intermediately of said film cartridge and said take-up spool, said projection member being projected higher than said first rail in said perpendicular direction; and
   a plate member having a flat surface for contacting said first and second rails when said back lid is closed and forming a film passage channel between said first and second rails and said flat surface, and a recess provided at a location corresponding to said projection member, said recess being of a sufficient size to receive said projection member therein.

4. A film guide device according to claim 3, wherein said projection member is formed on said first rail.

5. A film guide device according to claim 3, wherein said projection member has a surface inclined with respect to said perpendicular direction.

6. A film guide device according to claim 5, wherein said projection member has a conical surface.

* * * * *